(12) United States Patent
Ishige et al.

(10) Patent No.: US 8,854,393 B2
(45) Date of Patent: Oct. 7, 2014

(54) INFORMATION PROCESSING DEVICE, INFORMATION PROCESSING METHOD, AND PROGRAM

(75) Inventors: Hiroyuki Ishige, Tokyo (JP); Kazuhiro Suzuki, Tokyo (JP); Akira Miyashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 13/043,772

(22) Filed: Mar. 9, 2011

(65) Prior Publication Data

US 2011/0227945 A1  Sep. 22, 2011

(30) Foreign Application Priority Data

Mar. 17, 2010  (JP) ................. 2010-061127

(51) Int. Cl.
*G09G 5/00* (2006.01)
*G06T 19/00* (2011.01)

(52) U.S. Cl.
CPC .................. *G06T 19/006* (2013.01)
USPC ........... 345/619; 345/632; 345/169; 345/651; 345/653

(58) Field of Classification Search
USPC ............. 345/619, 632–633, 169, 158, 8, 1.1, 345/419, 156, 649, 651, 653; 463/31; 386/224; 715/863
See application file for complete search history.

(56) References Cited

U.S. PATENT DOCUMENTS

| | | | |
|---|---|---|---|
| 6,653,990 B1 * | 11/2003 | Lestruhaut | 345/8 |
| 8,351,773 B2 * | 1/2013 | Nasiri et al. | 396/55 |
| 2007/0046561 A1 * | 3/2007 | Cheon et al. | 345/1.1 |
| 2008/0094417 A1 * | 4/2008 | Cohen | 345/632 |
| 2008/0304707 A1 | 12/2008 | Oi et al. | |
| 2009/0066690 A1 * | 3/2009 | Harrison | 345/419 |
| 2010/0017722 A1 * | 1/2010 | Cohen | 345/632 |
| 2010/0017759 A1 * | 1/2010 | Birnbaum et al. | 715/863 |
| 2010/0045667 A1 * | 2/2010 | Kornmann et al. | 345/158 |
| 2011/0064375 A1 * | 3/2011 | Raghoebardajal et al. | 386/224 |
| 2011/0216002 A1 * | 9/2011 | Weising et al. | 345/158 |
| 2011/0250962 A1 * | 10/2011 | Feiner et al. | 463/31 |
| 2011/0254860 A1 * | 10/2011 | Zontrop et al. | 345/633 |
| 2011/0300522 A1 * | 12/2011 | Faubert et al. | 434/236 |
| 2012/0194517 A1 * | 8/2012 | Izadi et al. | 345/420 |
| 2013/0249792 A1 * | 9/2013 | Carraro et al. | 345/156 |
| 2014/0002359 A1 * | 1/2014 | Weising et al. | 345/158 |

FOREIGN PATENT DOCUMENTS

JP  2008-304268  12/2008

OTHER PUBLICATIONS

U.S. Appl. No. 13/131,831, filed May 27, 2011, Miyashita et al.
U.S. Appl. No. 13/043,772, filed Mar. 9, 2011, Ishige et al.

* cited by examiner

*Primary Examiner* — Chante Harrison
(74) *Attorney, Agent, or Firm* — Oblon, Spivak, McClelland, Maier & Neustadt, L.L.P.

(57) ABSTRACT

There is provided an information processing device includes a virtual space recognition unit for analyzing 3D space structure of a real space to recognize a virtual space, a storage unit for storing an object to be arranged in the virtual space, a display unit for making a display unit display the object arranged in the virtual space, a direction of gravitational force detection unit for detecting a direction of gravitational force of a real space, and a direction of gravitational force reflection unit for reflecting the direction of gravitational force detected by the detection unit in the virtual space.

16 Claims, 9 Drawing Sheets

INFORMATION PROCESSING DEVICE, INFORMATION PROCESSING METHOD, AND PROGRAM

BACKGROUND OF THE INVENTION

1. Field of the Invention

The present invention relates to an information processing device, an information processing method, and a program, and more particularly, to an arrangement of objects in augmented reality space.

2. Description of the Related Art

Recently, as an example of the augmented reality technology (hereinafter, referred to as an AR technology), virtual digital information is displayed to be superimposed on real space information such as a real-space image. To superimpose virtual digital information on real space information, it is necessary to reflect position information and posture information on real space in a virtual object to be superimposed.

For example, a technology for reflecting position information and posture information of an object included in an imaging data on 3D space based on position and posture of a camera, for example, is disclosed (for example, refer to JP-A-2008-304268).

SUMMARY OF THE INVENTION

When the virtual digital information (a virtual object) is to be superimposed to the real space information, it has been desired to reflect not only position information or posture information but also gravity information so as to give movements same as objects in real space to the virtual object. However, JP-A-2008-304268 has an issue that it is possible to reflect position information or posture information on the object, but that it is not possible to reflect gravity information on the object.

Therefore, in view of the aforementioned issues, the present invention provides an information processing device, an information processing method, and a program, which are novel and improved, and which are capable of reflecting a gravitational force direction of the real space in a virtual space recognized by analyzing a real space.

According to an embodiment of the present invention, there is provided an information processing device including a virtual space recognition unit for analyzing 3D space structure of a real space to recognize a virtual space, a storage unit for storing an object to be arranged in the virtual space, a display unit for making a display device display the object arranged in the virtual space, a detection unit for detecting a direction of gravitational force of the real space, and a direction of gravitational force reflection unit for reflecting the direction of gravitational force detected by the detecting unit in the virtual space.

Further, the information processing device may include an execution unit for executing predetermined processing based on the direction of gravitational force to the object in the virtual space in which the direction of gravitational force is reflected by the direction of gravitational force reflection unit.

Further, the detection unit may detect a change of the direction of gravitational force to the display device, and the direction of gravitational force reflection unit may reflect the change of the direction of gravitational force in the virtual space.

Further, the detection unit may detect position information of the display device in the virtual space.

Further, the execution unit may arrange the object based on the position information of the display device, and moves the object in the direction of gravitational force.

Further, the execution unit may arrange the object based on the position information of the display device, and moves a posture of the object in the direction of gravitational force.

Further, the execution unit may arrange the object based on the position information of the display device, and makes the object arranged vertically in the direction of gravitational force.

Further, the detection unit may detect the direction of gravitational force using an acceleration sensor.

According to another embodiment of the present invention, there is provided an information processing method including the steps of analyzing 3D space structure of a real space to recognize a virtual space, arranging an object in the virtual space, detecting a direction of gravitational force of the real space, reflecting the direction of gravitational force in the virtual space, and making a display device display the object arranged in the virtual space.

According to another embodiment of the present invention, there is provided a program causing a computer to function as an information processing device including a virtual space recognition unit for analyzing 3D space structure of a real space to recognize a virtual space, a storage unit for storing an object to be arranged in the virtual space, a display unit for making a display device display the object arranged in the virtual space, a detection unit for detecting a direction of gravitational force of a real space, and a direction of gravitational force reflection unit for reflecting the direction of gravitational force detected by the detection unit in the virtual space.

As described above, according to the present invention, it is possible to reflect a gravitational force direction of the real space on a virtual space recognized by analyzing a real space.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same In addition, "the best modes of embodiments of the invention" will be described in the following order.

[1] Object of Embodiment
[2] Overview of Information Processing Device
[3] Hardware Configuration of Information Processing Device
[4] Functional Configuration of Information Processing Device
[5] Details of Operations of Information Processing Device

[1] Object of Embodiment

At first, an aim of the present embodiment will be explained. Recently, as an example of the AR technology, virtual digital information is displayed to be superimposed on real space information such as a real-space image. When superimposing virtual digital information on real space information, it is necessary to recognize position information and posture information between an object on real space and a virtual object.

For example, a technology for reflecting position information and posture information of an object included in an imaging data on 3D space based on position and posture of a camera, for example, is disclosed.

When the virtual digital information (a virtual object) is to be superimposed to the real space information, it has been desired to reflect not only position information or posture information but also gravity information so as to give movements same as objects in real space to the virtual object. However, JP-A-2008-304268 has an issue that it is possible to reflect position information or posture information on the object, but that it is not possible to reflect gravity information on the object.

Therefore, in view of the aforementioned issue, an information processing device 10 according to the embodiment is contrived. According to the information processing device 10, it is possible to reflect a gravitational force direction of the real space in the virtual space that is recognized through analysis of the real space.

[2] Overview of Information Processing Device

Hereinbefore, the object of the embodiment was described. Next, the overview of the information processing device 10 is described with reference to FIGS. 1 to 3. An information processing terminal having a display device such as a mobile phone, a Personal Digital Assistant (PDA), a portable game machine, a small-sized Personal Computer (PC), and the like may be exemplified as the information processing device 10. In the information processing device 10, a virtual object which is to be superimposed on the real-space image is registered.

Figure 1:
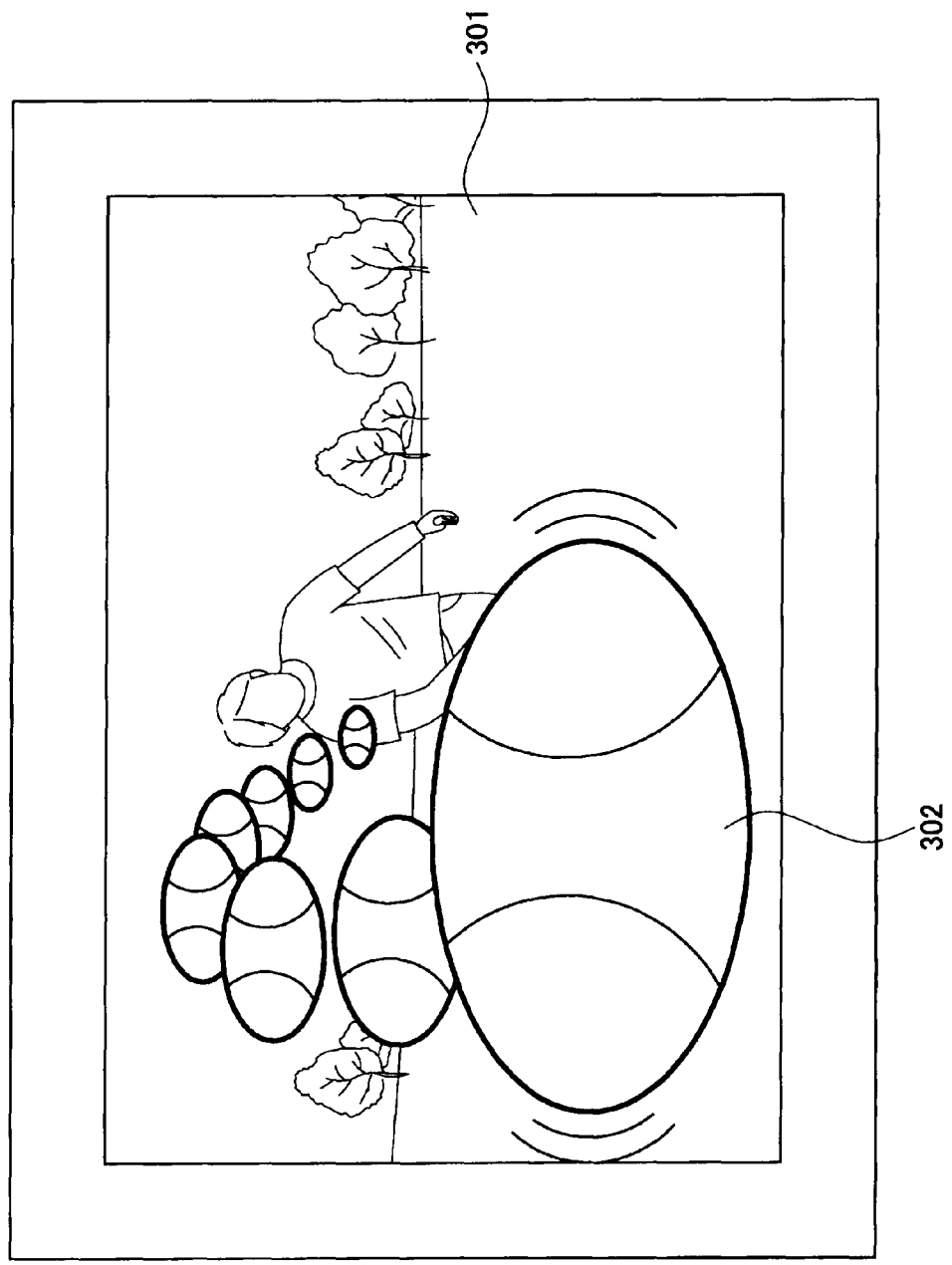
FIG. 1 is a diagram for explaining an AR technology.
Figure 2:
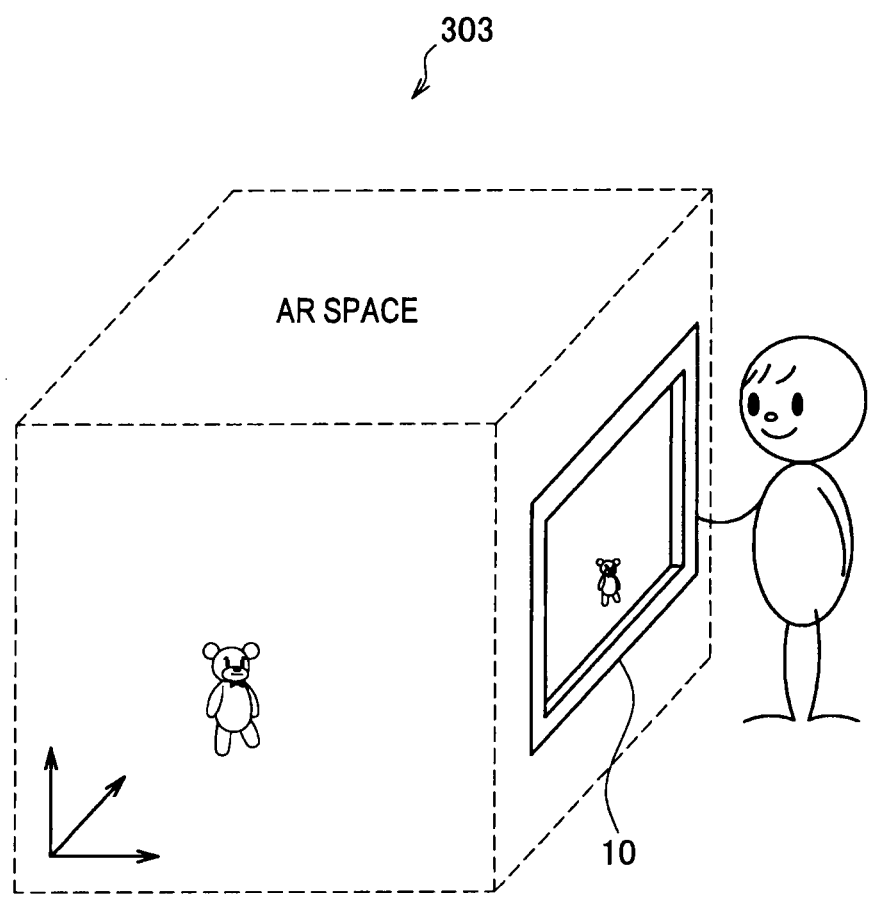
FIG. 2 is a diagram for explaining a virtual space recognized by analyzing a real space.
Figure 3:
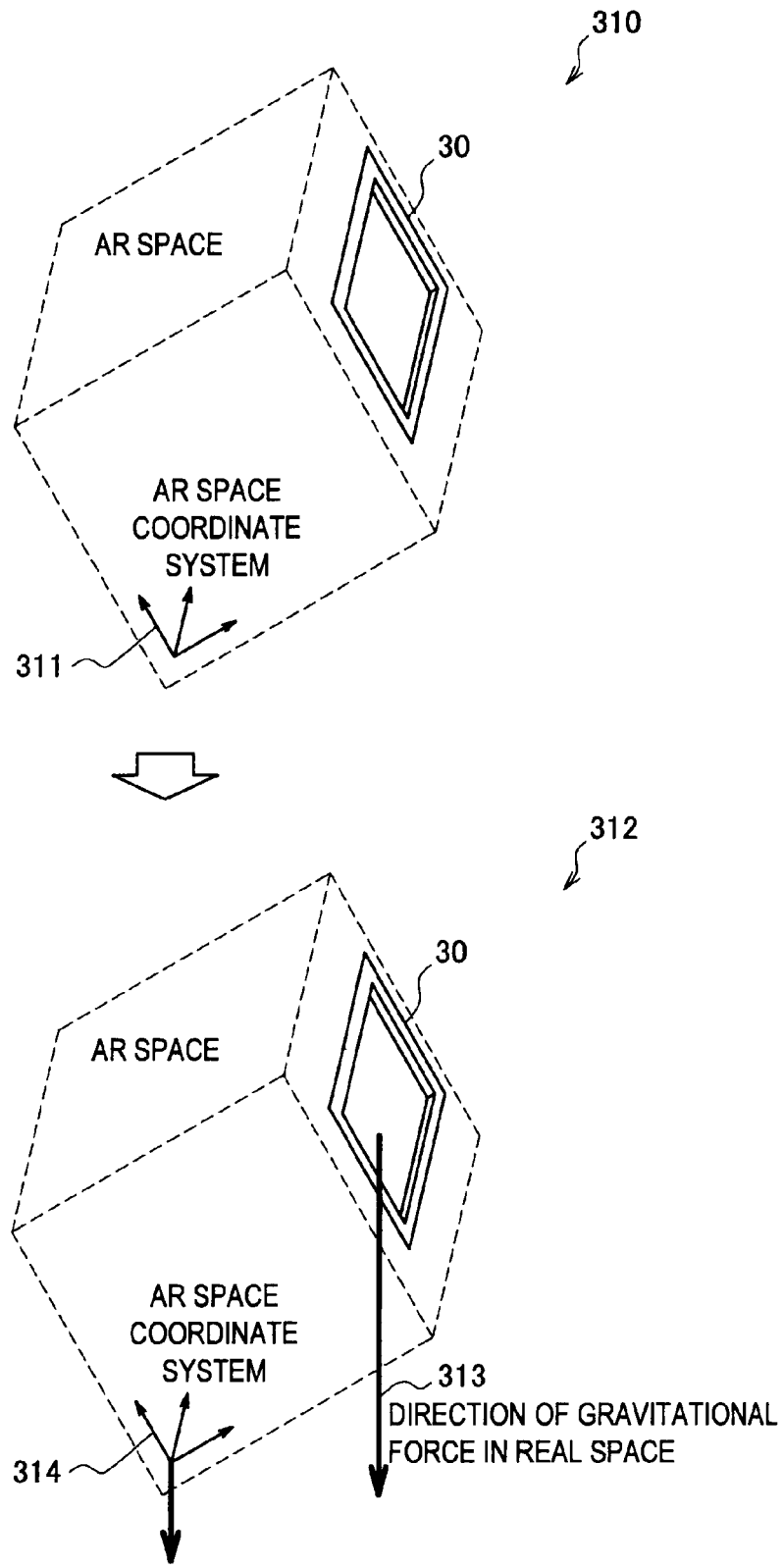
FIG. 3 is a diagram for explaining a reflection of a gravitational force direction on an AR space.

FIG. 1 is a diagram for explaining an AR technology. FIG. 2 is a diagram for explaining a virtual space (AR space) recognized by analyzing a real space. FIG. 3 is a diagram for explaining a reflection of a gravitational force direction in an AR space.

In FIG. 1, virtual digital information 302 is superimposed on a real-world image 301. Accordingly, complementary information can be synthesized and displayed on the real-world image 301. The real-world image 301 is an image in a real space captured by an image capturing device or the like. In addition, the virtual digital information 302 is a virtual object which is obtained by analyzing the real space and is arranged at an arbitrary position in the real space.

For example, in FIG. 1, a ball, as a virtual object, is superimposed on a display screen where a person taking an action of throwing the ball in the real space is displayed. In this manner, in the information processing device 10, digital image of the ball is synthesized into the image of the person in the real space, so that it may be shown that the person seems to be throwing the ball really.

Next, the virtual space (AR space) recognized by analyzing the real space is described with reference to FIG. 2. FIG. 2 illustrates a state where a virtual object is arranged in the AR space recognized by using the information processing device 10. The AR space is a space where a space coordinate system of a virtual space recognized by analyzing a real space is superposed on a space coordinate system of the real space. This means that, if the position in the real space coordinate system is determined, the coordinate in the AR space is uniquely determined. In other words, in the case where an AR object is arranged at an arbitrary position in the real space, the position at which the AR object is arranged in the AR space is uniquely determined.

The information processing device 10 according to the present embodiment reflects a direction of gravitational force of the real space on the AR space recognized by analyzing the real space. An explanation will be given on the reflection of the direction of gravitational force on the AR space with reference to FIG. 3. The explanatory view 310 of FIG. 3 shows the AR space coordinate system recognized by a device (a display device 30) in the real space. A space coordinate system 311 is a space coordinate system generated by a later-described virtual space recognition unit.

An arrow 313 of the explanatory view 312 shows a direction of gravitational force in the real space. The direction of gravitational force is to be detected using an acceleration sensor, or the like, mounted on the information processing device 10. A space coordinate system 314 in the explanatory view 312 is a reflection of the direction of gravitational force of the real space in the AR space coordinate system generated. If the AR object is arranged on the AR space coordinate system in which the direction of gravitational force is reflected, it becomes possible to execute predetermined processing in the direction of gravitational force to the arranged AR object. The predetermined processing in the direction of gravitational force means, for example, moving the AR object based on the direction of gravitational force, and updating the posture information of the AR object based on the direction of gravitational force, or the like.

As described above, when the direction of gravitational force is reflected in the AR space, it becomes possible to execute processing in an arbitrary direction based on the direction of gravitational force. Moreover, if the device position is changed in the AR space or if the direction of gravitational force in a device is changed as posture information of the device has changed, the direction of gravitational force on the AR space is to be dynamically updated.

If the direction of gravitational force of the device does not change even after the device position has been changed, it is not necessary to update the direction of gravitational force. The information processing device 10 according to the present embodiment makes it possible to reflect the direction of gravitational force in the AR space to provide the AR object arranged in the AR space with various movements.

[3] Hardware Configuration of Information Processing Device

Hereinbefore, the overview of the information processing device 10 has been described. Next, a hardware configuration of the information processing device 10 will be described with reference to FIG. 4.

Figure 4:
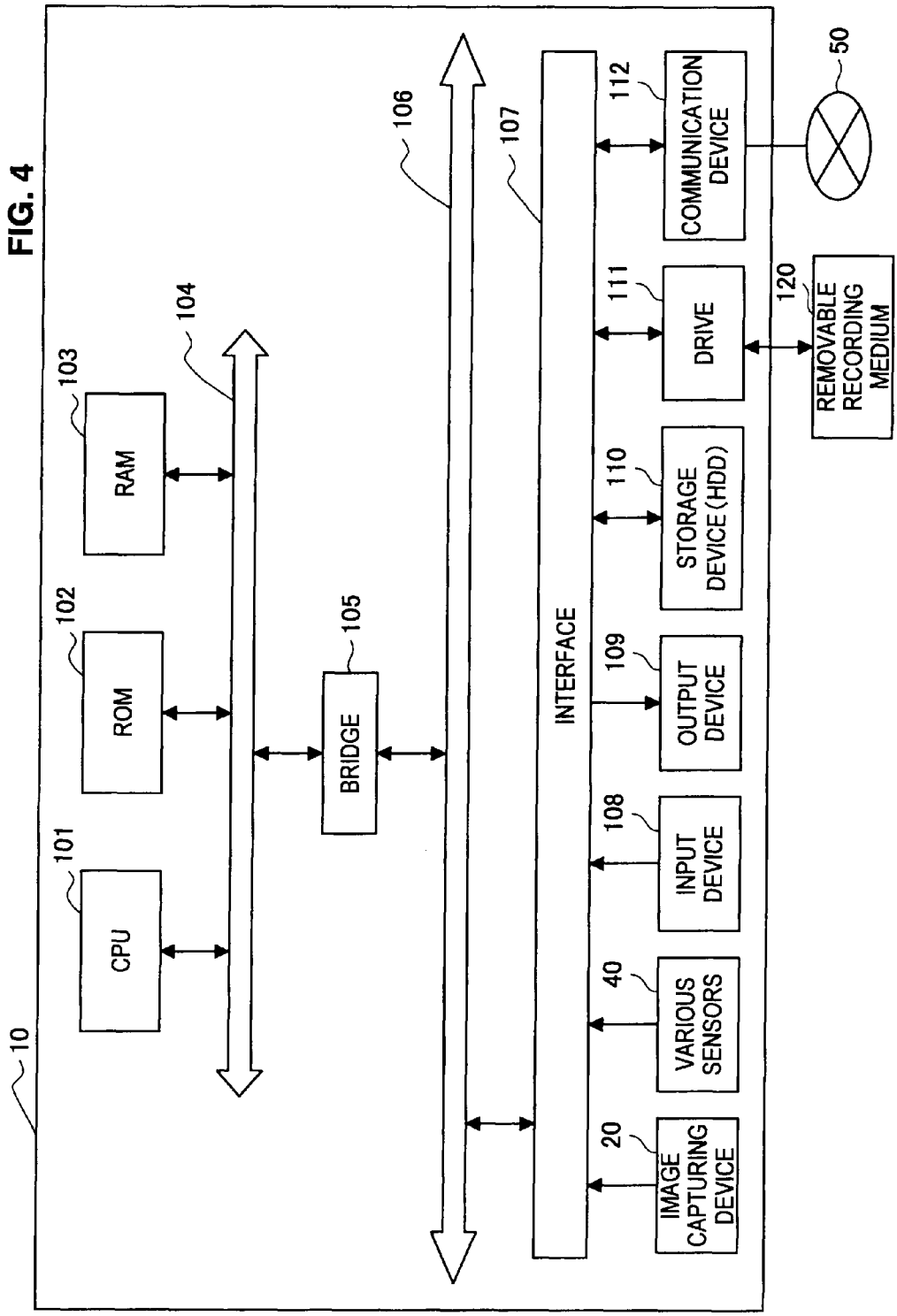
FIG. 4 is a block diagram for illustrating hardware configuration of an information processing device according to the present embodiment.

FIG. 4 is a block diagram illustrating a hardware configuration of the information processing device 10. The information processing device 10 includes a Central Processing Unit (CPU) 101, a Read Only Memory (ROM) 102, a Random Access Memory (RAM) 103, a host bus 104, a bridge 105, an external bus 106, an interface 107, an input device 108, an output device 109, a storage device (HDD) 110, a drive 111, a communication device 112, an image capturing device 20, and various sensors 40.

The CPU 101 functions as a calculation processing device and a control device to control overall operations of the information processing device 10 according to various programs. In addition, the CPU 101 may be a microprocessor. The ROM 102 stores programs, calculation parameters, or the like used by the CPU 101. The RAM 103 temporarily stores programs used for execution of the CPU 101, parameters appropriately changed in the execution, or the like. These components are connected to each other via a host bus 104 which is constructed with a CPU bus or the like.

The host bus 104 is connected to an external bus 106 such as a Peripheral Component Interconnect/Interface (PCI) bus through a bridge 105. In addition, the host bus 104 is not necessary configured to be separated from the bridge 105 and the external bus 106. The functions of these buses may be embedded in one bus.

The input device 108 is constructed with, for example, an input unit through which a user inputs information, such as a mouse, a keyboard, a touch panel, a button, a microphone, a switch, a lever, or the like, an input control circuit which generates an input signal based on the user's input and outputs the input signal to the CPU 101, and the like. The user of the information processing device 10 can input various types of data or make a command to perform a processing operation with respect to the information processing device 10 by manipulating the input device 108.

The output device 109 is constructed with, for example, a display device such as a Cathode Ray Tube (CRT) display device, a liquid crystal display (LCD) device, an Organic Light Emitting Display (OLED) device, a lamp, or the like and a sound output unit such as a speaker, a headphone, or the like. More specifically, the display device displays various types of information such as reproduced image data as a text or an image. On the other hand, the sound output unit converts the reproduced sound data or the like into sound and outputs the sound. The later-described display device 30 is an example of an output device 109.

The storage device 110 is a device for storing data, which is configured as an example of a storage unit of the information processing device 10 according to the embodiment. The storage device 110 may includes a storage medium, a recording device which records data on the recording medium, a reading device which reads data from the recording medium, a removing device which removes data recorded in the storage medium, and the like.

The storage device 110 is constructed with, for example, a Hard Disk Drive (HDD). The storage device 110 drives the hard disk to store programs executed by the CPU 101 or various data. In addition, in the storage device 110, later-described items, identification numbers, and the like are stored.

The drive 111 is a reader/writer for the storage medium, which is built in or attached to an outer portion of the information processing device 10. The drive 111 reads information recorded in a removable recording medium 24 mounted thereon, such as a magnetic disk, an optical disk, an opto-magnetic disk, or a semiconductor memory, and outputs the information to the RAM 103.

The communication device 112 is, for example, a communication interface which is constructed with a communication device or the like for connection to a communication network 50. In addition, the communication device 112 may be a communication device corresponding to a wireless Local Area Network (LAN), a communication device corresponding to a wireless USB, a wired communication device which performs communication through a wired line.

The image capturing device 20 has a function of capturing an image of a photographic subject by transforming light passing through the photographing lens to an electrical signal by a CCD and converting the analog signal to a digital signal. An image captured by the image capturing device 20 is displayed on a display device. Various sensors 40 are sensors for recognizing the virtual space, and for example, a geomagnetic compass or an acceleration sensor may be exemplified. Moreover, a direction of gravitational force detection device 41 capable of detecting the direction of gravitational force may be an example of the various sensors 40.

[4] Functional Configuration of Information Processing Device

Figure 5:
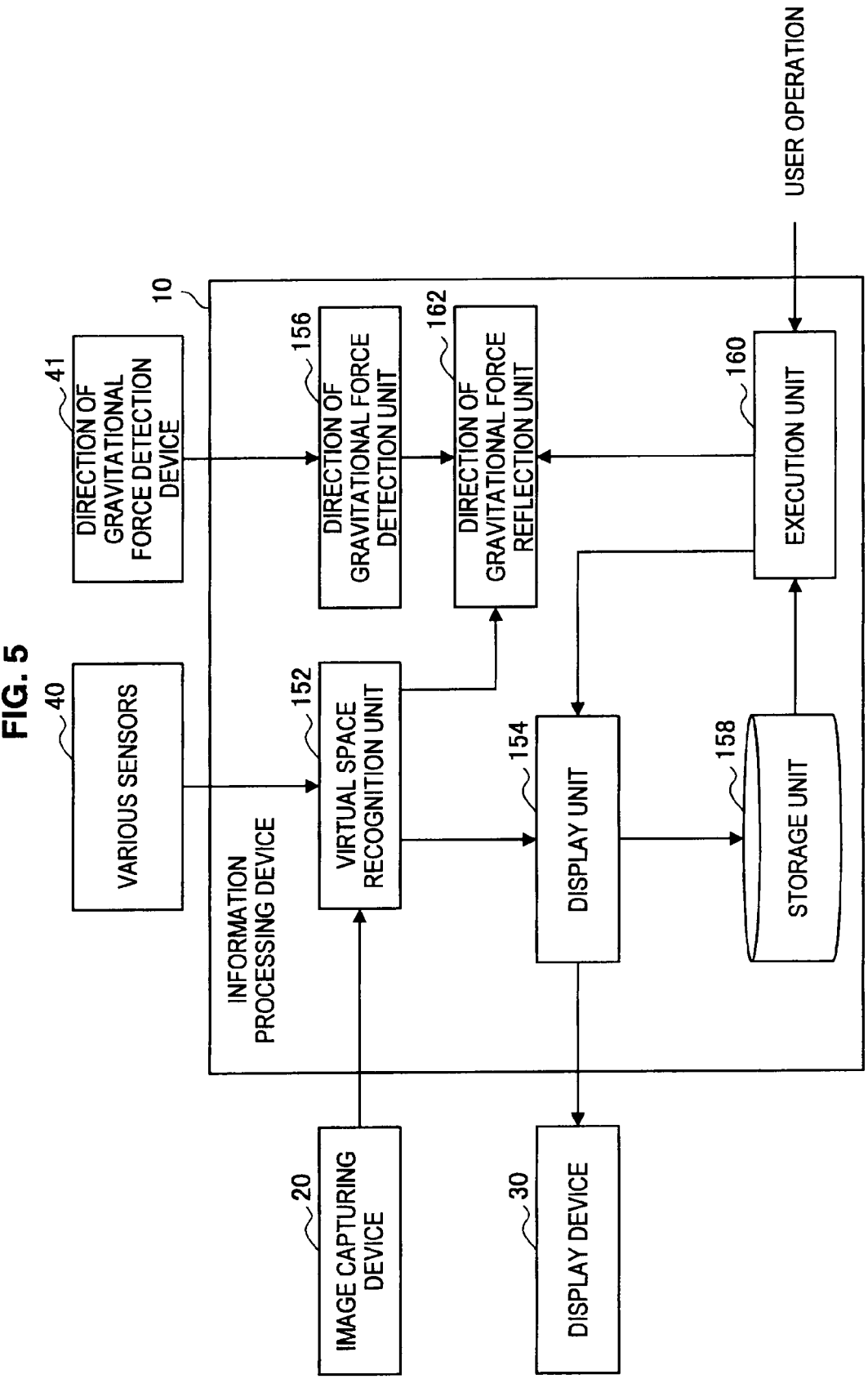
FIG. 5 is a block diagram for illustrating functional configuration of information processing device according to the present embodiment.

Hereinbefore, the hardware configuration of the information processing device 10 was described. Next, the functional configuration of the information processing device 10 according to the embodiment is described with reference to FIG. 5. FIG. 5 is a block diagram illustrating the functional configuration of the information processing device 10 according to the embodiment.

As illustrated in FIG. 5, the information processing device 10 includes a virtual space recognition unit 152, a display unit 154, a direction of gravitational force detection unit 156, a storage unit 158, an execution unit 160, an direction of gravitational force reflection unit 162, and the like.

The virtual space recognition unit 152 includes functions for analyzing 3D structure of a real space to recognize a virtual space (AR space). The virtual space recognition unit 152 includes functions for recognizing a position, a posture, a size, or a position of a camera, or the like in the AR space using image of the real space, various sensors such as a geomagnetic compass or an acceleration sensor, GPS, or the like. In other words, the virtual space recognition unit 152 includes a function for superposing a space coordinate system of the virtual space on a space coordinate system of the real space.

The display unit 154 includes a function for displaying the virtual space recognized by the virtual space recognition unit 152 on the display device 30. The display unit 154 displays objects arranged in the virtual space. Although the display device 30 is configured to be as an one device integrated with the information processing device 10 in the present embodiment, however, the present embodiment does not limited to this example but the display device 30 may be another device separated from the information processing device 10.

The direction of gravitational force detection unit 156 includes a function for detecting the direction of gravitational force of the real space. The direction of gravitational force detection unit 156 detects the direction of gravitational force of the real space using information of the direction of gravitational force provided by the direction of gravitational force detection device 41. In addition, the direction of gravitational force detection unit 156 may detect a change in the direction of gravitational force to recognized virtual space, and may make a later-described direction of gravitational force reflection unit 162 reflect the change in the direction of gravitational force in the virtual space. Further, it may detect position information of the image capturing device 20 in the virtual space. If the position information of the image capturing device 20 is detected by the direction of gravitational force detection unit 156, it may arrange a virtual object based on the position information. The direction of gravitational force detection unit 156 is an example of the detection unit of the present invention.

The storage unit 158 stores an object (AR object) to be arranged in the virtual space. The storage unit 158 may be a storage medium such as a nonvolatile memory, magnetic disk, optical disk, and MO (Magneto Optical) disk. The nonvolatile memory includes, for example, an EEPROM (Electrically Erasable Programmable Read-Only Memory) and EPROM (Erasable Programmable ROM). The magnetic disk includes a hard disk and disc-like magnetic disk. The optical disk includes a CD (Compact Disc), DVD-R (Digital Versatile Disc Recordable), and BD (Blu-ray Disc (registered trademark)).

Further, the storage unit 158 stores attribute information of the AR objects, such as position information, posture information, size, or the like of each AR object correlating with each other.

The direction of gravitational force reflection unit 162 has a function for reflecting the direction of gravitational force detected by the direction of gravitational force detection unit 156 in the virtual space that is recognized by the virtual space recognition unit 152. In addition, as described above, if the change in the direction of gravitational force to the image capturing device 20 is detected by the direction of gravitational force detection unit 156, the direction of gravitational force reflection unit 162 reflects the change in the direction of gravitational force in the virtual space.

The execution unit 160 has a function for executing predetermined processing based on the direction of gravitational force to an object (AR object) that is superimposed on a virtual space, in the virtual space in which the direction of gravitational force is reflected by the direction of gravitational force reflection unit 162. Here, the predetermined processing is, for example, processing for moving the AR object based on the direction of gravitational force, for updating the posture information of the AR object based on the direction of gravitational force, or the like.

Further, if position information of the image capturing device 20 in the virtual space is detected by the direction of gravitational force detection unit 156, the execution unit 160 may arrange the AR object in the virtual space based on the position information of the image capturing device 20, and may further move the AR object in the direction of gravitational force. In addition, the execution unit 160 may arrange the AR object in the virtual space based on the position information of the image capturing device 20, and may change the posture of the AR object in the direction of gravitational force. Further, the execution unit 160 may arrange the AR object in the virtual space based on the position information of the image capturing device 20, and may arrange the AR object vertically in the direction of gravitational force.

Figure 6:
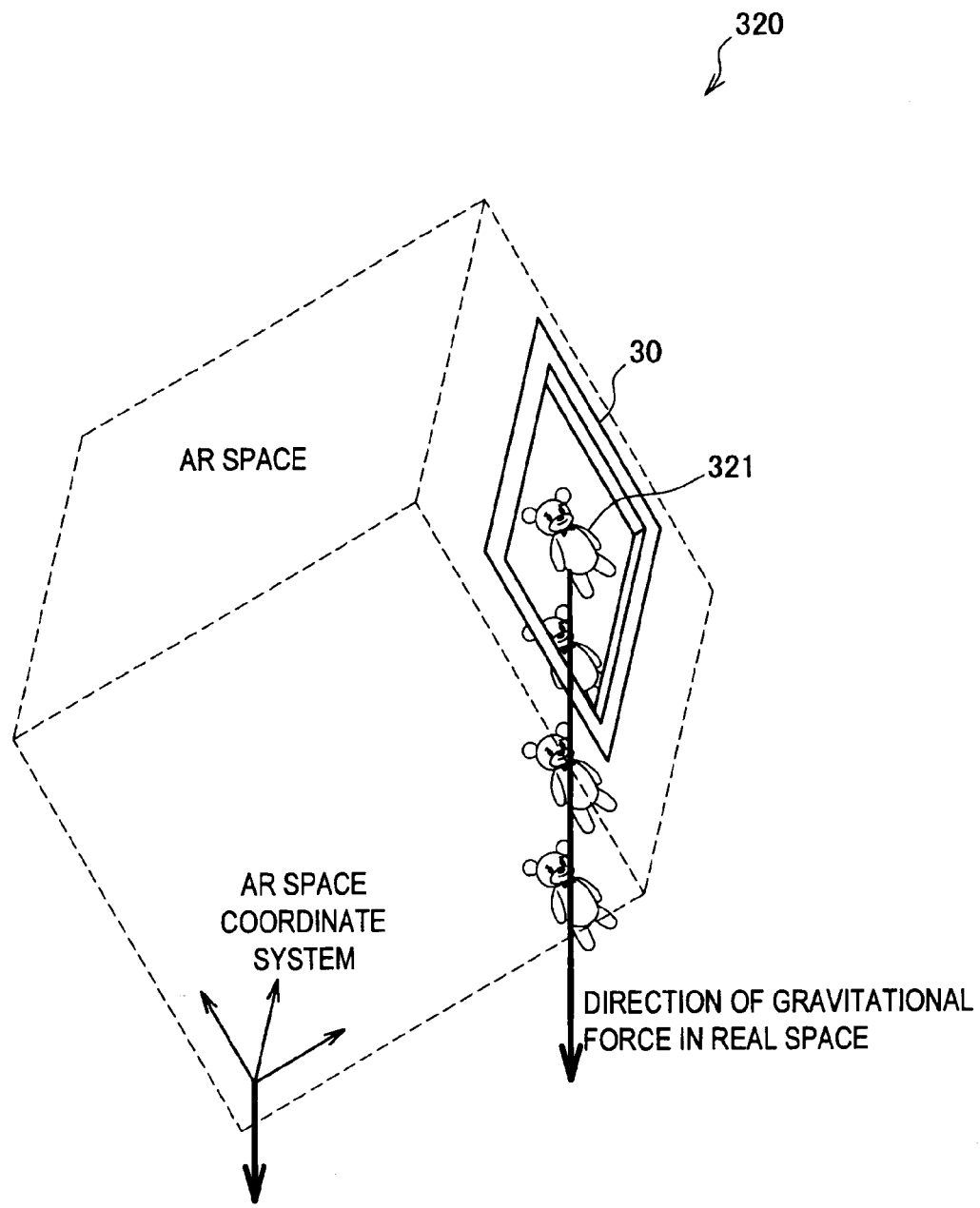
FIG. 6 is a diagram for explaining processing for an AR object according to the present embodiment.

Herein, an explanation will be given on processing for the AR object by the execution unit 160 with reference to FIG. 6 and FIG. 7. FIG. 6 shows how the AR object is arranged in the AR space. An object 321 is an AR object arranged in the AR space.

In the present embodiment, the above-described direction of gravitational force reflection unit 162 makes the direction of gravitational force of the real space reflected in the AR space. As shown in FIG. 6, the execution unit 160 makes the object 321 arranged in the AR space move toward the direction of gravitational force in the space coordinate system of the AR space. In this way, by moving the object 321 toward the direction of gravitational force in the space coordinate system of the AR space, it is possible to make a visual effect same as an object falling in the real space.

If a plane recognized as a flat surface exists in the direction of gravitational force of the AR space, the execution unit 160 may arrange the object 321, which has been moved in the direction of gravitational force, on the plane. By doing this, it becomes possible that the object 321 falling in the direction of gravitational force makes a visual effect same as the object hit a plane existed in the direction of gravitational force to fall to the plane. Here, the plane existed in the direction of gravitational force is a plane whose direction of gravitational force is vertical. Note that the plane may not necessarily be a plane vertical in the direction of gravitational force, but may be a plane that the moved object contacts with at first. Moreover, the position to be arranged after moving the object in the direction of gravitational force may be a position where the object contacts with another AR object, for example, a position where each position is located within a certain range of area.

Figure 7:
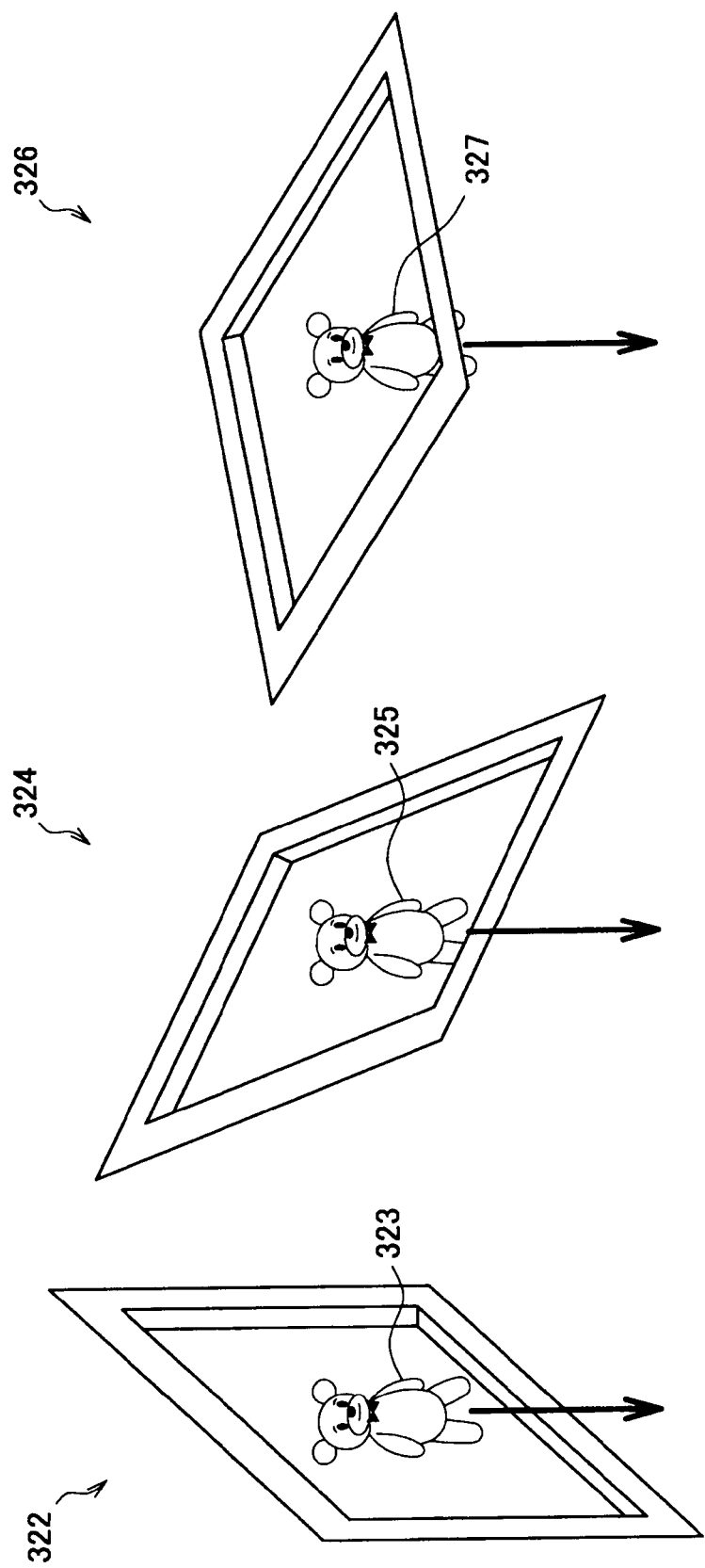
FIG. 7 is a diagram for explaining processing for an AR object according to the present embodiment.

As shown in FIG. 7, the execution unit 160 may always arrange the object that has been arranged in the AR space, vertically in the direction of gravitational force of the real direction. In this case, the execution unit 160, at first, arranges the object on the AR space based on a position of the image capturing device (device position). In the present embodiment, the object 321 is arranged in the AR space based on the position of the image capturing device in the AR space, however, regardless of the example, the object 321 may be arranged in the AR space based on the position of the display device.

The execution unit 160 may dynamically arrange the object arranged in the AR space so as to be always vertical to the direction of gravitational force that is reflected in the AR space. In other words, it may arrange the object so that the posture of the object becomes always vertical to the direction of gravitational force. For example, as the object 325 of a display example 324 and the object 327 of a display example 326, it is possible to makes a visual effect same as an object hanging down from the display screen of the display device 30.

As described above, not only by reflecting the direction of gravitational force detected by an acceleration sensor, or the like, in an object, but also by reflecting the direction of gravitational force of the AR space after arranging the AR object in the AR space, other processing in the AR space can be performed. Here, other processing in the AR space means, for example, processing corresponding to a result of comparison of position relationship with other object recognized in the AR space. For example, by determining a contact with other object, it is possible to display a movement in case of contacting. In addition, recognizing an obstacle, such as a wall, that is recognized in the AR space, a processing corresponding to the position relation ship with the obstacle may be performed.

As described above, by reflecting the direction of gravitational force of the AR space after arranging the AR object in the AR space, it is possible to understand the position relationship with other object or an obstacle recognized in the AR space, or to execute processing corresponding to the position relationship. By doing this, it is possible to make the AR object arranged in the AR space look as if it moves in the real space.

As above, processing by the execution unit 160 with regard to the AR object has been explained. As described above, according to the information processing device 10, it is possible to arrange the AR object in the AR space in which the direction of gravitational force of the real space is reflected, and to execute processing for the AR object according to the direction of gravitational force.

[5] Details of Operations of Information Processing Device

Figure 8:
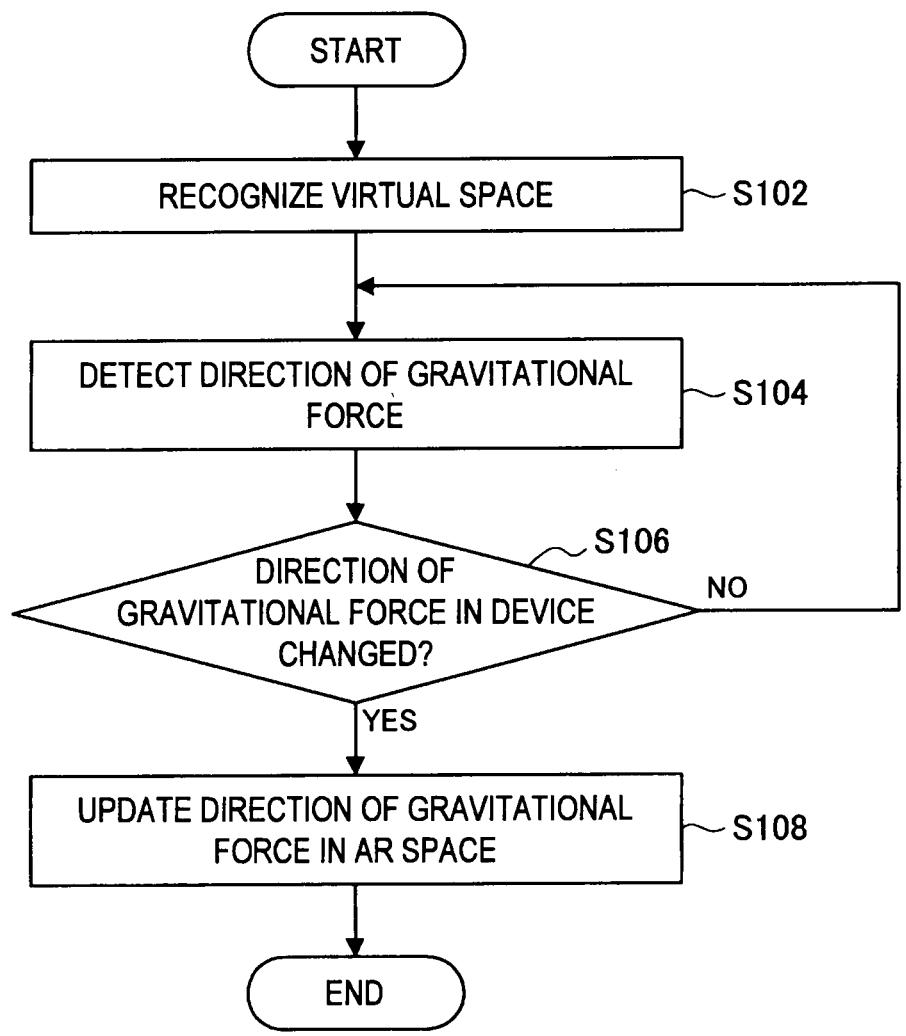
FIG. 8 is a flow chart indicating details of operation of an information processing device according to the present embodiment.
Figure 9:
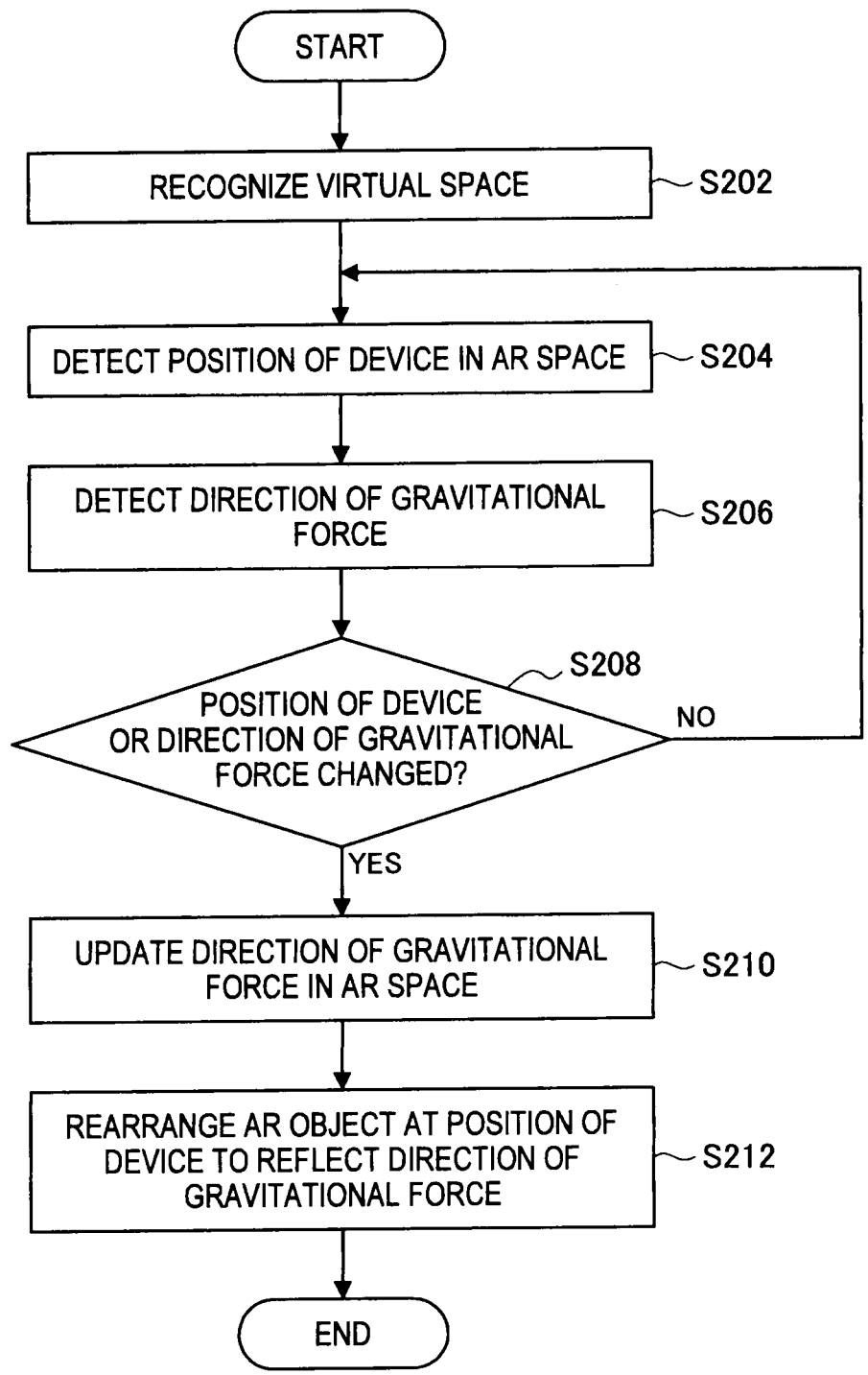
FIG. 9 is a flow chart indicating details of operation of an information processing device according to the present embodiment.

As above, the functional configuration of the information processing device 10 has been explained. Next, with reference to FIG. 8 to FIG. 9, the details operation of the information processing device 10 will be explained. FIG. 8 is a flow chart showing processing for reflecting the direction of gravitational force in the virtual space (the AR space). Further, FIG. 9 is a flow chart showing processing for reflecting a position of the image capturing device (a device position) and the direction of gravitational force in the AR object.

As illustrated in FIG. 8, the virtual space recognition unit 152 firstly analyzes 3D space structure of the real space to recognize the virtual space (the AR space) (S102). Subsequently, the direction of gravitational force detection unit 156 detects the direction of gravitational force of the real space (S104). In step S104, the direction of gravitational force detection unit 156 detects the direction of gravitational force of the real space using, for example, an acceleration sensor, or the like.

Subsequently, it is determined whether the direction of gravitational force has been changed in the device (the image capturing device) (S106). In step S106, the direction of gravitational force detection unit 156 detects a change of the direction of gravitational force to the device, or it may detect a change in the posture information of the device in the virtual space to detect the direction of gravitational force if there is any change.

In step S106, if it is determined that the direction of gravitational force of the device has been changed, the direction of gravitational force in the AR space is updated (S108). In step S106, if it is determined that the direction of gravitational force of the device has not been changed, processing subsequent to step S104 again.

As described above, by detecting the change of the direction of gravitational force of the real space with respect to the device and reflecting the change of the direction of gravitational force in the AR space, it is possible to execute processing based on the direction of gravitational force with respect to the AR object to be arranged in the AR space. As above, the processing for reflecting the direction of gravitational force in the virtual space has been explained.

Subsequently, with reference to FIG. 9, an explanation will be given on processing for reflecting the device position and the direction of gravitational force in the AR object. As shown in FIG. 9, at first, the virtual space recognition unit 152 analyzes 3D space structure of the real space to recognize the virtual space (the AR space) (S202). The direction of gravitational force detection unit 156 detects a position of the device (the display device 30) in the AR space (S204). Further, the direction of gravitational force detection unit 156 detects the direction of gravitational force of the real space (S206).

Subsequently, it is determined whether the device position detected in step S204 or the direction of gravitational force detected in step S206 has been changed (S208). The change of the device position is a change of the device position in the AR space, and the change of the direction of gravitational force is a change of the direction of gravitational force to the device.

If it is determined that the direction of gravitational force of the device has been changed in step S208, the direction of gravitational force in the AR space is updated (S210). If it is determined that the device position has been changed in step S208, the AR object is rearranged at the device position detected in step S204 (S212). Rearranging the AR object at the device position that is changed in step S212, the direction of gravitational force detected in step S206 is further reflected in the AR object.

In FIG. 9, the direction of gravitational force is detected after the device position in the AR space has been detected, however, regardless of the example, the device position may be detected after the direction of gravitational force has been detected. In addition, in step S212, the AR object is rearranged at the device position, however, regardless of the example, the AR object may be arranged at a position based on the device position. Further, if the position information of the image capturing device 20 has been detected in step S204, the AR object may be arranged based on the position of the image capturing device 20.

Moreover, in the above example, the AR object is arranged based on the direction of gravitational force, however, regardless of the example, an azimuth direction in the real space may be detected using a magnetic compass, or the like, so as to arrange the AR object based on a direction the azimuth direction indicates. For example, detecting a north direction using the magnetic compass, the AR object arranged in the AR space may be arranged so as to face always in the north direction.

As above, by reflecting the direction of gravitational force or the azimuth direction in the virtual space, it becomes possible to perform processing of moving an object based on the direction of gravitational force or the azimuth direction, or the like, and to provide various movements such as updating posture of the object.

It should be understood by those skilled in the art that various modifications, combinations, sub-combinations and alterations may occur depending on design requirements and other factors insofar as they are within the scope of the appended claims or the equivalents thereof.

For example, the steps in the process of the information processing device 10 described in the specification may not necessarily performed in time sequence according to the order disclosed as the flowchart. In other words, the steps in the process of the information processing device 10 may be performed in parallel in a different process.

In addition, the hardware such as a CPU, a ROM, and a RAM built in the information processing device 10 or the like may also be implemented by computer programs exhibiting the functions equivalent to those of the components of the aforementioned information processing device 10. In addition, a storage medium storing the computer programs is also provided.

The present application contains subject matter related to that disclosed in Japanese Priority Patent Application JP 2010-061127 filed in the Japan Patent Office on Mar. 17, 2010, the entire content of which is hereby incorporated by reference.

What is claimed is:

1. An information processing device comprising:
 circuitry configured to:
  analyze 3D space structure of a real space of an image of the real space to recognize a virtual space of the image;
  store an object to be arranged in the virtual space;
  make a display device display the object arranged in the virtual space;
  detect a direction of gravitational force of the real space;
  reflect the detected direction of gravitational force in the virtual space such that the object is displayed on the display device vertically in the direction of gravitational force regardless of a position of the display device;

execute predetermined processing based on the direction of gravitational force to the object in the virtual space in which the direction of gravitational force is reflected; and recognize a plane which exists in a direction of gravitational force in the virtual space, wherein the direction of gravitational force in the virtual space is determined based upon the direction of gravitational force in the real space.

2. The information processing device according to claim 1, wherein the circuitry is configured to:

detect a change of the direction of gravitational force to the display device, and reflect the change of the direction of gravitational force in the virtual space.

3. The information processing device according to claim 1, wherein the circuitry is configured to detect position information of the display device in the virtual space.

4. The information processing device according to claim 3, wherein the circuitry is configured to arrange the object based on the position information of the display device, and move the object in the direction of gravitational force.

5. The information processing device according to claim 3, wherein the circuitry is configured to arrange the object based on the position information of the display device, and move a posture of the object in the direction of gravitational force.

6. The information processing device according to claim 3, wherein the circuitry is configured to arrange the object based on the position information of the display device, and make the object arranged vertically in the direction of gravitational force.

7. The information processing device according to claim 1, wherein the circuitry is configured to detect the direction of gravitational force using an acceleration sensor.

8. The information processing device according to claim 1, wherein the circuitry is configured to recognize at least one of a position, a posture, a size, and a position of the information processing apparatus in the virtual space.

9. The information processing device according to claim 1, wherein the circuitry includes at least one of a geomagnetic compass, an acceleration sensor, and a GPS device.

10. The information processing device according to claim 1, wherein the circuitry is configured to superimpose a space coordinate system of the virtual space of the image on a space coordinate system of the real space of the image.

11. The information processing device according claim 1, wherein the circuitry is configured to arrange the object, which has been moved in the direction of gravitational force, on the plane.

12. The information processing device according to claim 11, wherein the circuitry is configured to cause the display device to display the object falling on the plane in the direction of gravitational force.

13. The information processing device according to claim 11, wherein the circuitry is configured to cause the display device to display the object as hitting the plane and falling in a direction of the plane.

14. The information processing device according to claim 1, wherein the circuitry is configured to recognize all of a position, a posture, a size, and a position of the information processing apparatus in the virtual space.

15. An information processing method comprising the steps of:

analyzing 3D space structure of a real space of an image of the real space to recognize a virtual space of the image;

arranging an object in the virtual space;

detecting a direction of gravitational force of the real space;

reflecting the direction of gravitational force in the virtual space;

making a display device display the object arranged in the virtual space such that the object is displayed on the display device vertically in the direction of gravitational force regardless of a position of the display device executing predetermined processing based on the direction of gravitational force to the object in the virtual space in which the direction of gravitational force is reflected; and recognizing a plane which exists in a direction of gravitational force in the virtual space, wherein the direction of gravitational force in the virtual space is determined based upon the direction of gravitational force in the real space.

16. A non-transitory computer readable medium storing a program causing which, when executed, causes a computer to function as an information processing device comprising:

a virtual space recognition unit for analyzing 3D space structure of a real space of an image of the real space to recognize a virtual space of the image;

a storage unit for storing an object to be arranged in the virtual space;

a display unit for making a display device display the object arranged in the virtual space;

a detection unit for detecting a direction of gravitational force of a real space;

a direction of gravitational force reflection unit for reflecting the direction of gravitational force detected by the detection unit in the virtual space such that the object is displayed on the display device vertically in the direction of gravitational force regardless of a position of the display device; and an execution unit for executing predetermined processing based on the direction of gravitational force to the object in the virtual space in which the direction of gravitational force is reflected by the direction of gravitational force reflection unit, wherein the execution unit recognizes a plane which exists in a direction of gravitational force in the virtual space, and the direction of gravitational force in the virtual space is determined based upon the direction of gravitational force in the real space.

* * * * *